US009262532B2

(12) United States Patent
Pueyo et al.

(10) Patent No.: US 9,262,532 B2
(45) Date of Patent: Feb. 16, 2016

(54) RANKING ENTITY FACETS USING USER-CLICK FEEDBACK (75) Inventors: Lluis Garcia Pueyo, Barcelona (ES); Mridul Muralidharan, Karnataka (IN); Roelof van Zwol, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 594 days.

(21) Appl. No.: 12/847,989

(22) Filed: Jul. 30, 2010

(65) Prior Publication Data

US 2012/0030152 A1 Feb. 2, 2012

(51) Int. Cl.
*G06F 17/30* (2006.01)
*G06Q 30/00* (2012.01)
*G06Q 30/02* (2012.01)

(52) U.S. Cl.
CPC ...... *G06F 17/30867* (2013.01); *G06F 17/3053* (2013.01); *G06F 17/30528* (2013.01); *G06F 17/30533* (2013.01); *G06F 17/30536* (2013.01); *G06F 17/30554* (2013.01); *G06F 17/30634* (2013.01); *G06F 17/30657* (2013.01); *G06F 17/30663* (2013.01); *G06F 17/30864* (2013.01); *G06Q 30/00* (2013.01); *G06Q 30/0254* (2013.01); *G06Q 30/0256* (2013.01)

(58) Field of Classification Search
CPC .............. G06F 17/30; G06F 17/30528; G06F 17/3053; G06F 17/30533; G06F 17/30536; G06F 17/30555; G06F 17/30634; G06F 17/30657; G06Q 30/00; G06Q 30/0254; G06Q 30/0256
USPC ........ 707/748, 750, 758, 769–771; 705/14.52
See application file for complete search history.

(56) References Cited

U.S. PATENT DOCUMENTS

| | | | | |
|---|---|---|---|---|
| 7,805,441 B2 * | 9/2010 | Madhavan | .......... | G06F 17/3066 707/713 |
| 7,840,589 B1 * | 11/2010 | Holt et al. | ...................... | 707/769 |
| 8,051,080 B2 * | 11/2011 | Kraft | ................ | G06F 17/30864 707/736 |
| 8,229,786 B2 * | 7/2012 | Cetin | .................... | G06Q 30/00 705/14.1 |
| 8,433,705 B1 * | 4/2013 | Dredze et al. | ................. | 707/723 |
| 8,909,655 B1 * | 12/2014 | McDonnell | ....... | G06F 17/30864 707/748 |
| 2002/0091661 A1 * | 7/2002 | Anick et al. | ....................... | 707/1 |
| 2006/0080321 A1 * | 4/2006 | Horn et al. | ...................... | 707/10 |
| 2006/0293950 A1 * | 12/2006 | Meek et al. | ...................... | 705/14 |
| 2006/0294071 A1 * | 12/2006 | Weare et al. | ....................... | 707/3 |
| 2007/0073579 A1 * | 3/2007 | Immorlica | ......... | G06Q 30/0267 705/14.47 |
| 2008/0208841 A1 * | 8/2008 | Zeng | ................ | G06F 17/30648 |
| 2009/0037402 A1 * | 2/2009 | Jones | ............... | G06F 17/30864 |
| 2009/0216710 A1 * | 8/2009 | Chang | .................... | G06Q 30/02 |
| 2009/0327271 A1 * | 12/2009 | Amitay et al. | .................... | 707/5 |
| 2010/0306161 A1 * | 12/2010 | Chen | ..................... | G06N 7/005 706/52 |
| 2011/0125764 A1 * | 5/2011 | Carmel et al. | ................ | 707/749 |
| 2012/0123857 A1 * | 5/2012 | Surve | ................. | G06Q 30/0241 705/14.49 |

FOREIGN PATENT DOCUMENTS

WO WO 2007/079393 * 7/2007
WO WO 2013/192101 * 12/2013

OTHER PUBLICATIONS

Ye et al., Stochastic Gradient Boosted Distributed Decision Trees, Nov. 2009, CIKM '09, pp. 1-4.*
Zeyuan Allen Zhu et al., "A Novel Click Model and Its Applications to OnlineAdvertising ",WSDM'10, Feb. 4-6, 2010, New York City, New York, USA, 1-10 pages.*
Wei Vivian Zhang, et al, "Comparing Click Logs and Editorial Labels for Training Query Rewriting," WWW2007, May 8-12, 2007, Banff CA, 4 pages.
Nick Craswell, et al, "An Experimental Comparison of Click Position-Bias Models," WSDM '08, Feb. 11-12, 2008, Palo Alto, CA, pp. 87-94.
U.S. Appl. No. 12/832,641, filed Jul. 8, 2010 entitled "Faceted Exploration of Media Collections,", 57 pages.

* cited by examiner

*Primary Examiner* — Srirama Channavajjala
(74) *Attorney, Agent, or Firm* — Berkeley Law & Technology Group, LLP (57) ABSTRACT

Example methods, apparatuses, or articles of manufacture are disclosed that may be implemented using one or more computing devices to facilitate or otherwise support one or more processes or operations associated with ranking entity facets using user-click feedback.

22 Claims, 5 Drawing Sheets

RANKING ENTITY FACETS USING USER-CLICK FEEDBACK

BACKGROUND

1. Field

The present disclosure relates generally to search engine information management systems and, more particularly, to ranking entity facets for a given query using user-click feedback for use with search engine information management systems.

2. Information

The Internet is widespread. The World Wide Web or simply the Web, provided by the Internet, is growing rapidly, at least in part, from the large amount of information being added regularly. A wide variety of information, such as, for example, web pages, text documents, images, audio files, video files, or the like is continually being communicated, identified, located, retrieved, accumulated, or stored. Various information databases including, for example, knowledge bases or collections of user-generated content, Web-based or otherwise, have become commonplace, as did related communication networks or computing resources that help users to access relevant information.

In certain instances, search engine information management systems or search engines may be utilized to locate or otherwise provide access to information. For example, service providers may employ search engines to enable a user to search the Web using one or more search terms or queries or to try to locate or retrieve information that may be relevant to one or more queries. In addition to retrieving information, search engines may employ one or more functions or processes to rank information, such as retrieved documents, files, etc. and to display documents, files, etc. in an order that may be based, at least in part, on various ranking measures, such as, for example, relevance, usefulness, popularity, web traffic, recency, or the like. Search engines may further arrange or present information, such as, for example, retrieved documents, files, etc. in a variety of different formats. Because of the large amount and distributed nature of information on the Web, locating or presenting information in an efficient or effective manner may be valuable for both users inexperienced at web searching and for advanced "web surfers."

With an overabundance of information being available or accessible over the Internet, search engine information management systems as well as information retrieval techniques continue to evolve or improve. Effectively or efficiently locating or retrieving information on the Web may facilitate or support information-seeking behavior of search engine users, thus, leading to increased usability of a search engine. However, how to rank information in terms of relevance continues to be an area of development. Accordingly, with so much information being available, there is a continuing need to develop one or more methods, systems, or apparatuses that may implement efficient or effective information retrieval or presentation techniques.

BRIEF DESCRIPTION OF THE DRAWINGS

Non-limiting and non-exhaustive aspects are described with reference to the following figures, wherein like reference numerals refer to like parts throughout the various figures unless otherwise specified.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, and articles of manufacture are disclosed herein that may be implemented, partially, dominantly, or substantially, to rank entities that occur in a faceted relationship or facets using user-click feedback. Typically, although not necessarily, faceted relationships may describe recognized associational attributes between or among entities and facets or refer to some characteristic of mutual dependency between or among entities and facets. As will be described in greater detail below, faceted relationships may be represented, for example, via one or more entity-facet pairs associated with or extracted from the vocabulary of one or more information corpora, such as, for example, one or more extraction corpora. As used herein, "entity," "query entity," or the plural form of such terms may be used interchangeably and may refer to one or more lexical objects descriptive or representative of a query that may be defined, for example, by its canonical name, a set of aliases, or its type. Entities may comprise, for example, celebrities, movies, locations, points of interest, events, or the like, just to name a few examples. As a way of illustration, some examples of various entities may include those shown in Table 1 below. As seen, the entity "person," such as "Daniel Day-Lewis," for example, may be also defined by the alias "Daniel Day Lewis" (e.g., not hyphenated). Likewise, the location entity "Geneva, Switzerland" may include, for example, a number of aliases, such as "Geneva," "Genève," or "Genf." Of course, such entities are merely examples to which claimed subject matter is not limited.

TABLE 1

Example entities.

| name | Daniel Day-Lewis | name | Geneva, Switzerland |
|---|---|---|---|
| aliases | Daniel Day Lewis | aliases | Geneva; Genève; Genf |
| type | person | type | location |

"Facet" or "entity facet," as the terms used herein, may refer to one or more lexical objects representative of one or more concepts, aspects, properties, attributes, or characteristics of an entity that may be defined, for example, via a directed relationship between an entity e and an entity facet f, such as, for example, in a faceted relationship or relation (e, f). A plurality of facets may be related to a particular entity via a large number of faceted relations, such as, for example, subordinate, subsumed, associational, dependent, curative, hierarchical, etc. By way of example, the location entity "London" may be related to a large number of facets, such as "Big Ben," "London Eye," "Tower Bridge," "British Museum," "Trafalgar Square," etc. through a subsumed "city—landmarks" relation. In addition to subsumed relations, an entity may also have a large number of associational or suggestive relations with entity facets. As a way of illustration, the entity "Venice" may be associated, for example, with or suggestively related to a number of facets, such as "museums," "hotels," "wine tasting," "carnival," "sightseeing," gondolas," "graffiti," "film festival," etc. via a "location—event/activity" relation.

From a user experience perspective, certain factors besides or in addition to relevance, such as, for example, freshness, coverage, interestingness, popularity, news-worthiness, etc. of facets may also play a role in ranking facets with respect to an entity of interest. As will be seen, these factors may be taken into consideration or advantageously utilized by a ranking function in trying to predict or anticipate user intent while making faceted recommendations on a returned search results page. Importance of these factors may, for example, depend, at least in part, on an application, context of a search, nature of an entity, etc. For example, "points of interests" as facets of an entity representing a particular location may be more static or less prone to change overtime than "person," "movie," or "event" facets of an entity "celebrity." In one particular simulation or experiment, some examples of top five facets for the celebrity entity "Daniel Day-Lewis" (e.g., more fluid or likely to change overtime, less static, etc.) and for the location "Geneva, Switzerland" (e.g., less likely to change overtime, more static, etc.) included those presented in Table 2 below, though claimed subject matter is not so limited.

TABLE 2

Example facets.

| Celebrity: Daniel Day-Lewis | Location: Geneva, Switzerland |
|---|---|
| 1. Rebecca Miller | 1. Jet d'Eau |
| 2. Winona Ryder | 2. Plain palais |
| 3. There Will Be | 3. Arve |
| 4. Gangs of New York | 4. Reformation Wall |
| 5. Johnny Depp | 5. St. Pierre Cathedral |

As used herein, "information corpus" or in the plural form, "information corpora," may refer to an organized collection of any type of information accessible over the Internet or associated with an intranet(s), such as, for example, one or more electronic documents, web sites, databases (e.g., user-generated, service provider-generated, etc.), discussion forums or blogs (e.g., collective, collaborative, etc.), query logs, audio, video, image, or text files, or the like. Vocabularies of information corpora may, although not necessarily, be organized around domain-specific topics and may include many entity classes or types (e.g., cities, people, landmarks, locations, animals, jobs, holidays, etc.) having a large number of relations (e.g., subsumed, subordinate, dependent, curative, hierarchical, associational, etc.), as was also indicated. An information corpus may comprise, for example, a relatively open or fluid vocabulary, meaning that the content of an information corpus may change over time. Optionally or alternatively, a vocabulary of an information corpus may be relatively static, for example, meaning that the vocabulary may remain relatively unchanged over time. Thus, by way of example, facets associated with an information corpus with a fluid or relatively fluid vocabulary, such as, for example, a user-generated content may be more prone to change overtime with respect to a given entity. Also, information corpora may comprise or be represented by, for example, one or more external corpora (e.g., Internet databases, websites, on-line portals or blogs, etc.), one or more internal corpora (e.g., query logs, etc.), or any combination thereof, though claimed subject matter is not so limited.

In certain implementations, one or more information corpora may, although not necessarily, be subdivided into one or more extraction corpora and one or more ranking corpora. For example, as previously mentioned, one or more entities and faceted relationships may be extracted or otherwise collected by accessing the vocabulary of one or more extraction corpora so as to create a dictionary or pool of related candidate facets for an entity of interest. As will be described in greater detail below, one or more information corpora, such as, for example, one or more ranking corpora may be used to extract or otherwise derive one or more statistical features capturing relevance between extracted facets and a given entity to facilitate or support one or more mechanisms or processes in connection with ranking of facets associated with such a dictionary or pool, for example. In addition, certain example implementations may utilize more than one information corpus, and such corpora may be separate or overlapping, for example, or one corpus may be a subset of another.

Following the above discussion, "extraction corpus" or in the plural form, "extraction corpora," as used herein, may refer to one or more information corpora that may be used, in whole or in part, to extract or collect entities or related facets (e.g., faceted relationships) or, in one particular implementation, types of faceted relationships. By way of example but not limitation, some examples of faceted relationships as well as types of relationships extracted or collected in connection with one particular simulation or experiment are illustrated in Table 3 below. It should be appreciated that entity-facet pairs and respective relationships shown are merely examples to which claimed subject matter is not limited.

TABLE 3

Example entity-facet pairs and relationships.

| entity e | Daniel Day-Lewis | entity e | Geneva, Switzerland |
| entity f | Gangs of New York | entity f | Jet d'Eau |
| type | played in | type | subsumes |

As used herein, "ranking corpus" or in the plural form, "ranking corpora" may refer to one or more information corpora that may be used, in whole or in part, to facilitate or support ranking of facets utilizing one or more features, measures, metrics, etc., statistical or otherwise, extracted or derived from such ranking corpora. For example, as will be described in greater detail below, one or more ranking corpora may be used to extract or derive one or more statistical features in connection with performing a statistical analysis associated with predicting an actual click-through rate (CTR) on a facet, just to illustrate one possible implementation. Thus, in this context, one or more information corpora (e.g., external, internal, etc.) used, for example, to extract or otherwise collect entities or faceted relationships to create a dictionary or pool of facets may comprise or be representative of extraction corpora. In a similar fashion, one or more information corpora (e.g., external, internal, etc.) used, for example, to rank extracted or collected facets for a given entity in such a dictionary or pool may comprise or be representative of ranking corpora. It should be appreciated that extraction or ranking corpora may or may not be separate or overlapping.

As was previously mentioned, one or more techniques, operations, or processes associated with ranking entity facets using user-click feedback may, for example, be utilized, in whole or in part, by a search engine or other like information management system to determine how to respond to a search query or perform other information processing functions. More specifically, as illustrated in example implementations described herein, one or more entities or faceted relationships (e.g., entity-facet pairs, etc.) may be extracted or obtained, for example, from one or more extraction corpora so as to create a dictionary or pool of facets for an entity of interest. As will be seen, in one particular implementation, such extraction corpora may comprise, for example, a collective knowledge of user-generated content created by one or more on-line or virtual communities. To illustrate, one or more virtual communities may collaboratively contribute to one or more on-line databases, for example, by sharing their knowledge, which may subsequently be utilized to extract one or more faceted relationships of interest. To facilitate or support facet ranking, one or more statistical features capturing relevance between facets and a given entity may be extracted or otherwise derived, for example, from one or more ranking corpora, as previously mentioned. In an implementation, ranking corpora may comprise, for example, one or more query logs reflecting user behavior information collected or archived over a certain period of time, as one possible example. As used herein, "query log" may refer to one or more information databases or repositories generated during one or more information searches (e.g., by search engine users, etc.), which may comprise, for example, a sequence of search actions, queries or search terms, documents viewed, documents clicked on, a resource identifier of a clicked result and a result position, user identifier (ID), session ID, event ID, time stamp, etc. In addition, various user-generated content or knowledge databases, such as, for example, one or more user-annotated image or photo sharing databases may also be accessed to extract or otherwise derive one or more statistical features capturing relevancy information with respect to faceted relationships of interest, as will also be seen.

In an implementation, co-occurrence statistics with respect to faceted relationships of interest extracted or derived from ranking corpora may be analyzed, and a number of metrics or measures used for ranking entity facets may be computed. Such metrics or measures may comprise, for example, one or more statistical features based, at least in part, on one or more variants of conditional probabilities with respect to entities or pairs of entities occurring or co-occurring within the vocabulary of one or more information corpora, such as, for example, one or more ranking corpora. As will be seen, in one implementation, a conditional user probability may be computed or estimated, at least in part, as a statistical probability of a particular entity co-occurring together (e.g., in the vocabulary of one or more ranking corpora) with a related facet with respect to a particular user. A conditional user probability-based feature may account for and, thus, be less prone to an impact of a single user searching for a particular query, for example, a number of times within a certain time frame. Accordingly, such a feature may help to prevent or reduce an instance(s) where a single user may overly influence or affect statistics (e.g., via probability scores, etc.) with respect to a ranking order of facets.

In addition, one or more combined features or metrics may be computed or estimated based, at least in part, on user behavior information collected from one or more query logs. In an implementation, one or more combined features may be included in a feature space allowing a learner function to make a more informed decision in defining its learning task, such as a task of learning a ranking function, for example, if a particular combined feature is more descriptive. As will be seen, to compute one particular combined feature, a conditional user probability of a facet given a particular entity may be combined, for example, with a probability of such a facet, just to illustrate one possible implementation. Also, in certain implementations, user-click feedback information in the form of "click" or "view" statistics in relation to a particular facet for a given entity may be collected or obtained from one or more query logs, and one or more statistical values may be computed or estimated. For example, such one or more statistical values may comprise one or more variants of click-through rates (e.g., raw CTR, conditional CTR, bucketed CTR, normalized CTR, etc.) as well as a click-over-expected-click (COEC) variant, though claimed subject matter is not so limited. Typically, although not necessarily, "click" or "clicking" may refer to a selection process made by any pointing device, such as, for example, a mouse, track ball, touch screen, keyboard, or any other type of device capable of selecting one or more documents, for example, within a search results page via a direct or indirect action from a user or client. It should be noted that a selection process may be made via a touch screen (e.g., of a tablet personal computer (PC), mobile communication device, etc.), wherein "clicking" may comprise "touching." In addition, "view" or "views" may refer to a process or circumstance in which one or more facets (e.g., represented by a document, image, etc.) are shown or presented to a user or client (e.g., on a display, via a graphical user interface or GUI, etc.). For example, facets may be shown or presented in a set of returned search results listed in a particular order (e.g., by relevance, etc.), just to illustrate one possible implementation. Particular examples of various click-through rates as well as of a COEC variant will be described in greater detail below.

As was mentioned, in certain implementations, one or more learner functions (e.g., employing one or more machine learning techniques) may be trained and used to establish one or more machine-learned functions. More specifically, as illustrated in example implementations described herein, such one or more machine-learned functions may comprise, for example, a ranking function established based, at least in part, on one or more inputs or applications of user-click feedback in conjunction with one or more statistical features extracted or derived from one or more ranking corpora. In one particular implementation, a ranking function may be trained, for example, to predict or estimate an actual CTR on a facet based, at least in part, on user-click feedback information in conjunction with one or more statistical features by employing a stochastic gradient boosted decision trees (GBDT) learner, as will be described below. For a given entity representative of a query, then, relevant entity facets may be ranked using one or more established ranking functions. Results of such ranking may be implemented, in whole or in part, for use with a search engine or other like information management systems, for example, responsive to search queries. As will also be seen, in one particular implementation, one or more techniques associated with ranking entity facets using user-click feedback may be employed, for example, to facilitate or support one or more processes associated with faceted image searches, though claimed subject matter is not limited in this regard.

Before describing some example methods, apparatuses, or articles of manufacture in greater detail, the sections below will first introduce certain aspects of an example computing environment in which information searches may be performed. It should be appreciated, however, that techniques provided herein and claimed subject matter are not limited to these example implementations. For example, techniques provided herein may be adapted for use in a variety of information processing environments, such as database applications, language model processing applications, etc. In addition, any implementations or configurations described herein as "example" are described herein for purposes of illustrations and are not to be construed as preferred or desired over other implementations or configurations.

The World Wide Web, or simply the Web, may provide a vast array of information accessible worldwide and may be considered as an Internet-based service organizing information via use of hypermedia (e.g., embedded references, hyperlinks, etc.). Considering the large amount of resources available on the Web, it may be desirable to employ one or more search engine information management systems, which may herein be called simply search engines, to help locate or retrieve relevant or useful information, such as, for example, one or more documents of a particular interest. A "document," "web document," or "electronic document, as the terms used herein, are to be interpreted broadly and may include one or more stored signals representing any source code, text, image, audio, video file, or like information that may be read by a special purpose computing apparatus and may be played or displayed to or by a user or client. Documents may include one or more embedded references or hyperlinks to images, audio or video files, or other documents. For example, one type of reference that may be embedded in a document and used to identify or locate other documents comprises a Uniform Resource Locator (URL). As a way of illustration, documents may include an e-mail, an Extensible Markup Language (XML) document, a web page, a media file, a page pointed to by a URL, just to name a few examples.

In the context of a search, a query may be submitted via an interface, such as a graphical user interface (GUI), for example, by entering certain words or phrases to be queried, and a search engine may return a search results page, which may include a number of documents typically, although not necessarily, listed in a particular order. Under some circumstances, it may also be desirable for a search engine to utilize one or more techniques or processes to rank documents so as to assist in presenting relevant or useful search results in an efficient or effective manner. Accordingly, a search engine may employ one or more functions or operations to rank documents estimated to be relevant or useful such that, for example, more relevant or useful documents are presented or displayed more prominently among a listing of search results (e.g., more likely to be seen by a user or client, more likely to be clicked on, etc.). As was indicated, in one particular implementation, a ranking function may comprise, for example, a machine-learned function trained to predict or estimate an actual CTR on a facet for a given entity representative of a query, though claimed subject matter is not so limited. Following the above discussion, in processing a query, a search engine may place documents that are deemed to be more likely to be relevant or useful in a higher position or slot on a returned search results page. In turn, documents that are deemed to be less likely to be relevant or useful may be placed in lower positions or slots among search results, for example. A user or client, thus, may receive and view a page or other electronic document that may include a listing of search results presented, for example, in decreasing order of relevance, just to illustrate one possible implementation.

As was previously mentioned, in one particular implementation, ranked facets may be integrated or incorporated, for example, into a search results page so as to possibly enhance user experience in the context of a faceted image search by providing an ergonomic or interactive user environment. For example, a displayed page may include one or more segmented portions incorporating various facets representing search results grouped, at least in part, by a type of faceted relationships (e.g., related persons, related movies, related locations, etc.). Thus, facets may be ranked with respect to a particular entity (e.g., a query) in relation to one or more other facets within such one or more groups. In certain simulations or experiments, it has been observed that typically, although not necessarily, grouping by type of faceted relationships in the context of, for example, a faceted image search may make navigating among documents much easier, thus, leading to a higher engagement of the user with facets shown (e.g., more likely to be seen by a user or client, more likely to be clicked on, etc.). Of course, this is merely one possible example relating to presenting search results in the context of a faceted image search, and claimed subject matter is not limited in this regard.

Figure 1:
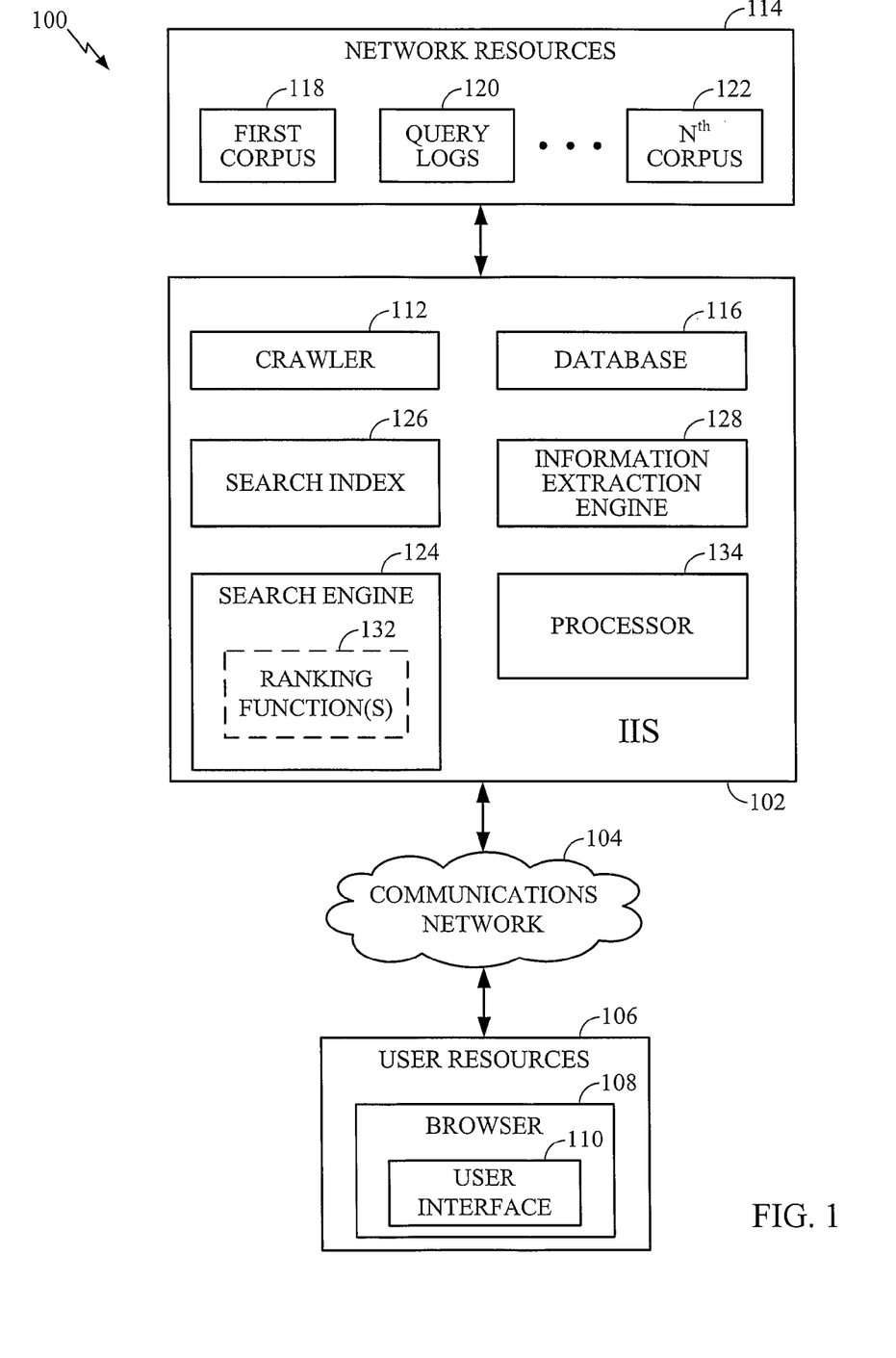
FIG. 1 is a schematic diagram illustrating certain functional features of an implementation of an example computing environment.

Attention is now drawn to FIG. 1, which is a schematic diagram illustrating certain functional features of an implementation of an example computing environment 100 capable of facilitating or supporting, in whole or in part, one or more processes associated with ranking entity facets using user-click feedback. Example computing environment 100 may be operatively enabled using one or more special purpose computing apparatuses, information communication devices, information storage devices, computer-readable media, applications or instructions, various electrical or electronic circuitry and components, input information, etc., as described herein with reference to particular example implementations.

As illustrated in the present example, computing environment 100 may include an Information Integration System (IIS) 102 that may be operatively coupled to a communications network 104 that a user or client may employ in order to communicate with IIS 102 by utilizing resources 106. It should be appreciated that IIS 102 may be implemented in the context of one or more information management systems associated with public networks (e.g., the Internet, the World Wide Web) private networks (e.g., intranets), public or private search engines, Real Simple Syndication (RSS) or Atom Syndication (Atom)-based applications, etc., just to name a few examples.

Resources 106 may comprise, for example, any kind of special purpose computing device (e.g., mobile device, PDA, etc.) communicating or otherwise having access to the Internet over a wired or wireless network. Resources 106 may include a browser 108 and an interface 110 (e.g., a GUI, etc.) that may initiate a transmission of one or more electrical digital signals representing a query. Browser 108 may facilitate access to and viewing of documents over the Internet, for example, such as HTML web pages, pages formatted for mobile devices (e.g., WML, XHTML Mobile Profile, WAP 2.0, C-HTML, etc.), or the like. Interface 110 may comprise any suitable input device (e.g., keyboard, mouse, touch screen, digitizing stylus, etc.) and output device (e.g., display, speakers, etc.) for interaction with resources 106. Even though a certain number of resources 106 are illustrated in FIG. 1, it should be appreciated that any number of resources may be operatively coupled to IIS 102 via, for example, communications network 104.

IIS 102 may employ a crawler 112 to access network resources 114 that may include, for example, any organized collection of information accessible via the Internet, the Web, one or more servers, etc. or associated with one or more intranets. Crawler 112 may follow one or more hyperlinks associated with documents and may store all or part of a document (e.g., XTML, XML, URL, FTP, or other pointers of information) in a database 116.

As previously mentioned, network resources 114 may include various corpora of information, such as, for example, a first corpus 118, query logs 120, and so forth up through a Nth corpus 122, any of which may include any organized collection of any type of information accessible over the Internet or associated with one or more intranets. As was also indicated, information corpora may be subdivided into an extraction corpus or corpora and a ranking corpus or corpora. For example, in one particular implementation, first corpus 118 may be used to extract entities and faceted relations of interest (e.g., extraction corpora), and query logs 120 may be used to rank such relations (e.g., ranking corpora) utilizing one or more statistical features extracted or otherwise derived from query logs 120. Network resources 114 may include other extraction or ranking corpora, such as, for example, various user-generated content or knowledge databases, video or photo annotation corpora, etc. that may be used, partially, dominantly, or substantially, to facilitate or support one or more processes associated with ranking entity facets using user-click feedback. Of course, these are merely examples of various information corpora that may be associated with network resources 114 to which claimed subject matter is not limited. It should be noted that, optionally or alternatively, certain information, such as, for example, certain user behavior information associated with one or more query logs may be stored in database 116 or like collection of information (e.g., internal corpus, etc.) operatively coupled to or otherwise associated with IIS 102.

IIS 102 may further include a search engine 124 supported by an index, such as, for example, a search index 126 and operatively enabled to search for information associated with network resources 114. For example, search engine 124 may communicate with interface 110 and may retrieve and display a listing of search results associated with search index 126 in response to one or more digital signals representing a query.

Information associated with search index 126 may be generated by an information extraction engine 128, for example, based, at least in part, on extracted content of a file, such as an XTML file associated with a particular document during a crawl. In certain implementations, it may be advantageous to utilize one or more real-time indexing techniques or processes, for example, to keep search index 126 sufficiently or continually updated with a real-time content (e.g., facets, etc.). As such, IIS 102 may be operatively enabled to subscribe to or otherwise be integrated with one or more information corpora via a "live" or direct feed, for example. As a way of illustration, IIS 102 may be enabled to subscribe to a direct photostream feed, for example, from Flickr® photo annotation corpus, thus, providing more current or fresh facets associated with Flickr® database so as to facilitate or support ranking mechanisms based, at least in part, on occurrence or co-occurrence statistics with respect to faceted relationships within the database. Of course, this is merely one possible example, and claimed subject matter is not so limited.

As previously mentioned, it may be desirable for a search engine to employ one or more processes to rank search results to assist in presenting relevant and useful information in response to a query. Accordingly, IIS 102 may employ one or more ranking functions, indicated generally in dashed lines at 132, to rank search results in an order that may, for example, be based, at least in part, on a relevance to a query. In one particular implementation, ranking function(s) 132 may determine relevance of one or more facets based, at least in part, on user-click feedback information in conjunction with one or more statistical features capturing relevance between facets and a query, as will be described in greater detail below. In certain example implementations, a ranking order of facets for a given query may be determined, for example, by considering a linear combination of conditional probabilities extracted or derived from one or more ranking corpora with respective weights for each corpus, though claimed subject matter is not so limited. It should be noted that ranking function(s) 132 may be included, partially, dominantly, or substantially, in search engine 124 or, optionally or alternatively, may be operatively coupled to it. As illustrated, IIS 102 may further include a processor 134 that may be operatively enabled to execute special purpose computer-readable code or instructions or to implement various processes associated with example environment 100, for example.

In operative use, a user or client may access a particular search engine website (e.g., www.yahoo.com, etc.), for example, and may submit or input a query by utilizing resources 106. Browser 108 may initiate communication of one or more electrical digital signals representing a query from resources 106 to IIS 102 via communication network 104. IIS 102 may look up search index 126 and establish a listing of documents based, at least in part, on relevance according to ranking function(s) 132, for example. IIS 102 may then communicate such a listing to resources 106 for displaying on interface 110.

With this in mind, example techniques will now be described in greater detail that may be implemented, partially, dominantly, or substantially, to efficiently or effectively rank entity facets using user-click feedback. As was indicated, one or more entities as well as related facets may be extracted or otherwise obtained from the vocabulary of one or more information corpora, such as, for example, one or more extraction corpora, so as to create a dictionary or pool of candidate facets for one or more entities of interest. More specifically, in an implementation, entities and related facets may be extracted or obtained, for example, from a set of structured or semi-structured sources or like collection of information (e.g., user-generated, service provider-generated, external, etc.) where entities and facets are explicitly marked-up, though claimed subject matter is not so limited. Without intending to be limiting in any way, one benefit of such an approach may include, for example, reducing or eliminating a need to perform relatively complex, time-consuming, or otherwise costly entity recognition on raw text associated with the vocabulary of extraction corpora. Optionally or alternatively, a number of other techniques or processes, such as, for example, one or more string matching solutions or algorithms may be utilized to match an entity of interest to a corresponding relation instance. In this example, movie or TV databases, web-based news services or sites, celebrity information portals or blogs, on-line encyclopedias, geographic or travel databases, such as, for example, Wikipedia® (e.g., www-.wikipedia.org), GeoPlanet™ (e.g., http://developer.yahoo.com/geo/geoplanet), Internet Movie Database (IMDb)® (e.g., www.imdb.com), Freebase® (e.g., www.freebase.com), or the like may be included in a set of extraction corpora. Again, these corpora or sources are provided herein by way of non-limiting examples. As a way of illustration, some examples of entities and related facets in the form of entity-facet pairs extracted and stored in a dictionary or pool of faceted recommendations with a type of relationship may include those illustrated in Table 1 and Table 3 above.

As previously mentioned, in an implementation, one or more statistical features capturing relevance between facets and related entities of interest may be extracted or otherwise derived from one or more information corpora, such as, for example, one or more ranking corpora. Statistical features may, for example, be used to facilitate or support, in whole or in part, one or more techniques, operations, or processes associated with ranking entity facets using user-click feedback, as was also indicated. For example, one or more statistical features may be used, at least in part, to train or establish a machine-learned ranking function determining a ranking order of facets by predicting or estimating an actual CTR on a facet for a given entity representative of a query, as will be seen. Of course, such details relating to a ranking function are merely examples to which claimed subject matter is not limited.

More specifically, in an implementation, certain statistical information reflecting relevancy of extracted faceted relationships for a given query may be collected, for example, from one or more ranking corpora and may be analyzed in some manner. As will be described in greater detail below, such statistical information may comprise, for example, query term information or query session information collected from one or more query logs over a certain period of time. In addition, certain statistical information related to co-occurrences of entity-facet pairs represented by tags annotating images or photos associated with the vocabulary of a user-annotated image or photo sharing database, for example, may be also collected and analyzed. As used herein, "tag" may refer to one or more identifying terms assigned to or otherwise associated with an image and descriptive of such an image in a way that enables a user to locate the image by filtering a collection of images associated with such one or more identifying terms. Statistical information collected from ranking corpora may be processed in some manner, for example, to arrive at a common format that may be used to perform a statistical analysis, as will be seen. For example, formatted statistics may be used to compute or generate a number of statistical features or metrics based, at least in part, on a co-occurrence analysis of entities and facets within a given event. As will be described below, an event or event space may comprise, for example, a page view with respect to a query term analysis or a set of consecutive page views (e.g., within a certain time frame or window, etc.) for a query session analysis. With respect to one or more annotated image or photo sharing databases, an event space may comprise, for example, a collection of images or photos (e.g., public, shared, etc.) in which tags uniquely identify a particular image or photo in such a space. Of course, these are merely examples relating to given events or event spaces that may be considered, and claimed subject matter is not limited in this regard.

By way of example, one possible common format suitable for performing a statistical analysis utilizing statistics collected from different ranking corpora may include one representd in Table 4 below. Thus, consider:

TABLE 4

Example common format suitable for a statistical analysis.

```
CFDATA       ::=
    EventId <tab> UserId <tab> TimeStamp
    <tab> EVENTDATA <newline>
EVENTDATA ::=
    ENTITYENTRY ( <comma> ENTITYENTRY) *
ENTITYENTRY ::=
    (
```

TABLE 4-continued

Example common format suitable for a statistical analysis.

```
        Entity |
        <open_bracket>
            Entity <pipe>
            Entity ( <comma> Entity)*
        <close_bracket>
    )+
```

As will be described in greater detail below with reference to a query term analysis, here, for example, a query, such as the query "Cubbon park in Bangalore India" entered or inputted by a user in the context of an image search may generate the following non-limiting output or result:

e1001 u01 t1 cubbon+park, {bangalore+india|bangalore, india}

Following the above discussion, in an implementation, statistical information reflecting user behavior collected from one or more query logs may include, for example, an event ID (e.g., EventId), a user ID or a browser cookie (e.g., UserId), a time stamp (e.g. TimeStamp), an event data or information (e.g., EVENTDATA), or an entity entry (e.g., ENTITYENTRY), though claimed subject matter is not so limited. For purposes of explanation, an event ID (e.g., represented by e1001 in the example above) may comprise, for example, a unique identifier within a defined event space. A user ID (e.g., u01, etc.) may uniquely identify a particular user and may comprise, for example, a browser cookie or a user's account ID (e.g., anonymized). A time stamp (e.g., t1, etc.) may register the start time of a particular event and, in certain example implementations, may be stored in UNIX time format (e.g., 1256395594, etc.). An event data or information may describe entities that have been detected during an event, for example, as:

cubbon+park, {bangalo+india|bangalore, india}

An entity entry may be a single entity reference (e.g., "cubbon park," etc.) or a composed reference, for example. This may occur, for example, if a compound phrase, such as "Bangalore, India" is detected. In addition to or besides phrases or compound references, one or more entities referring to individual terms, such as "Bangalore" or "India," etc. may also be detected and added in a dictionary or pool. Thus, once statistical information is properly formatted, a number of statistical features or metrics may be derived from different ranking corpora based, at least in part, on a co-occurrence analysis of entities within a given event, as was indicated.

As was mentioned above, to account for relevance of facets for a given entity, a co-occurrence analysis of query terms entered or inputted by users in a search engine, which may herein be termed as a query term analysis, may be performed. In one particular implementation, a query term analysis may, for example, be performed based, at least in part, on statistical information collected from query logs in the context of image searches, though claimed subject matter is not so limited. Typically, although not necessarily, an image search may refer to searching, locating, or retrieving one or more images from one or more databases of images (e.g., digital, etc.) or like collection of information by inputting one or more search terms (e.g., a query) into a search engine, such as, for example, an image search engine. A search engine may locate and retrieve a number of images that are deemed to be more likely to be relevant or useful to a query based, at least in part, on analyzing one or more tags, text, keywords, annotations, color distribution, region or shape attributes, etc. associated with such images.

In certain implementations, it may be desirable to consider, for example, multi-term queries as input for a co-occurrence analysis, though claimed subject matter is not so limited. Here, a tokenization based, at least in part, on word boundaries may prove to be insufficient, however, since some or most of facets associated with a pool or dictionary may comprise phrases or compound terms, such as person names, movie titles, location names, etc. Accordingly, a particular query may be initially tokenized based, at least in part, on word boundaries, and tokens may be normalized using one or more normalization techniques, just to illustrate one possible implementation. For example, a Normalization Form Canonical Decomposition (NFD) or other forms of normalization suitable for reducing tokens to a desired normalized form may be applied. In addition, a sliding window technique may be used, for example, over tokens so as to find or locate entity references in a particular query, for example, for purposes of query segmentation. Once a query is segmented, collected statistics may be transformed in a common format, and event information may be encoded using such a format. By way of example but not limitation, one non-limiting approach of entity detection for a given query is illustrated in Table 5 below, which may be taken into consideration, in whole or in part, in connection with a query term analysis. Here, for example, four entity references were detected, and the term "in" was omitted since no entity matches were found in a pool or dictionary of facets. Of course, such entity detection details are merely examples, and claimed subject matter is not limited in this regard.

TABLE 5

Example entity detection for a query term analysis.

| | |
|---|---|
| User query: | Cubbon park in Bangalore, India |
| Tokenization: | Cubbon + park + in + Bangalore + India |
| Normalization: | cubbon + park + in + bangalore + india |
| Segmentation: | cubbon + park + in + bangalore + india |
| Entity detection: | cubbon + park, {bangalore + india\|bangalore, india} |

In certain simulations or experiments, it has been observed that typically, although not necessarily, length of queries entered or inputted by users tend to be relatively short (e.g., less than three or four terms, etc.). Accordingly, in certain implementations, instead of or to complement a query term analysis, statistical information relating to co-occurrences of entity-facet pairs in a user session may also be collected and analyzed, as previously mentioned. A query session analysis may utilize, for example, image query log information collected in connection with a query term analysis, though claimed subject matter is not so limited. An event space for a query session analysis may be defined, for example, as a set of consecutive queries issued by the same user within a certain period of time (e.g., 10, 15, etc. minutes), as previously mentioned. As a way of illustration, during a query session, a user may, for example, first search for "India," then may expand a query into "Bangalore, India," and then may decide to search for "Cubbon park" within a certain time frame defining an event space (e.g., 15 minutes, etc.), just to illustrate one possible example. Here, for example, following information may be collected for such a query session:

e9001 u01 t2 india, bangalore+india, cubbon+park

For a query session analysis, a particular query may be tokenized and normalized, at least in part, in a fashion similar to a query term analysis above, for example, but, in certain implementations, further segmentation of the query may be omitted. In one particular implementation, only whole queries may be matched against entities in a pool or dictionary of facets in connection with entity detection, though claimed subject matter is not limited in this regard. In certain simulations or experiments, it has been observed that a user is likely to enter or input several queries during a particular session due to, for example, an explanatory nature of image searches. Thus, an average number of queries entered in a query session may typically, although not necessarily, exceed an average number of query terms. In addition, it has also been observed that a user is likely to change to several related topics within a session, which may herein be termed as a lateral exploration. Accordingly, collecting statistics related to a faceted exploration rather that to a lateral exploration is a desirable goal in a query session analysis.

As previously mentioned, in an implementation, a query term analysis or a query session analysis may be supplemented or replaced with an analysis of co-occurrences of tags that annotate images or photos associated with the vocabulary of an image or photo sharing databases (e.g., user-generated, etc.). In one particular implementation, a tag co-occurrence analysis may be performed, for example, using statistical information collected from the vocabulary of a photo annotation corpus Flickr®, though claimed subject matter is not so limited. Various other ranking corpora with a sufficient coverage of location-related, travel-related, etc. entities, for example, as well as topics of more general nature (e.g., news, celebrities, concerts, etc.) may be used to collect tag-based statistics reflecting relevance of extracted facets for a given query. Here, a tag analysis may be based, at least in part, on a set of publicly available or shared images or photos with an event space defined, for example, around tags used to annotate an image or photo. To illustrate one particular non-limiting example, a user may annotate an image or photo, for example, with tags: Cubbon park, Bangalore, India. Here, for each of these tags, a tokenization and normalization may be applied in a fashion similar to a query term analysis or a query session analysis. In certain implementations, though, tag boundaries may be preserved, for example, as defined by a user. Thus, in this particular example, statistical information with respect to a tag analysis may be collected as:

e8008 u01 t3 cubbon+park, bangalore, india

Again, this is merely an example, and claimed subject matter is not so limited.

It should be appreciated that claimed subject matter is not limited in scope to employing a particular approach with respect to extracting or processing suitable statistical information associated with one or more ranking corpora or sources, such as, for example, one or more query logs. For instance, in certain implementations, the following example format may also be considered:

eventId <tab> userId (<tab> e1,e2)+

Here, for example, eventId may comprise pageviewID, and userID may comprise a browser cookie. Also, if an interest score (e.g., a ranking score of co-occurring pairs in a particular event, etc.) needs to be computed, a week Id may be added to each line, for example, and a common model or operation (e.g., utilizing a conditional probability of an entity-facet pair, etc.) may be recomputed over a desired number of weeks (e.g., last ten, twelve, fifteen weeks, etc.).

In this example, as described below, a query may be normalized, one or more entities of interest in such a query may be detected, for example, and one or more entity-facet pairs (e.g., non-overlapping, etc.) may be generated or extracted. It should be noted that, optionally or alternatively, queries comprising, for example, more than a certain number of dictionary terms (e.g., ten, twelve, fourteen terms, etc.) may be considered to be spam or otherwise ignored or discarded, though claimed subject matter is not so limited.

More specifically, here, in the context of a query term analysis, for example, the query "FC Barcelona SPAIN, Camp Nou" may be normalized as:

fc+barcelona+spain+camp+nou producing five tokens, as illustrated. Thus, given the following example term index

| nName | Token Sequences |
|---|---|
| barcelona | barcelona |
| spain | spain |
| barcelona+spain | barcelona |
| barcelona+spain | barcelona+spain |
| fc+barcelona | fc |
| fc+barcelona | fc+barcelona |
| camp+nou | camp |
| camp+nou | camp+nou | and after iterating over the tokens of the above query, the following entries may be detected:

| fc+barcelona | 1-2 |
|---|---|
| barcelona | 2 |
| barcelona+spain | 2-3 |
| spain | 3 |
| camp+nou | 4-5 |

As a result, with respect to the example query "FC Barcelona SPAIN, Camp Nou," a number of non-overlapping entity pairs (e.g., including permutations, etc.) may comprise those illustrated below:

| eLeft | eRight |
|---|---|
| fc+barcelona | spain |
| fc+barcelona | camp+nou |
| barcelona | spain |
| barcelona | camp+nou |
| barcelona+spain | camp+nou |
| spain | camp+nou |

Of course, such details relating to entity detection or entity-facet pair (e.g., non-overlapping, etc.) generation are merely examples, and claimed subject matter is not limited in this regard.

Having collected or processed desired statistical information in some manner, such as, for example, in one or more manners described above, a statistical analysis so as to generate or compute one or more statistical features or metrics capturing relevance between facets and a given query may be performed. More specifically, a ranking order of facets per corpora or source (e.g., query term, query session, or tag collections) may be computed. For example in connection with a query term analysis, for the query "Cubbon park in Bangalore India" represented by detected entities as:

e1001 u01 t1 cubbon+park, {bangalor+india|bangalore, india}, all possible co-occurring entity pairs or objects may be computed. Thus, consider:

cubbon+park–bangalore+india
cubbon+park–bangalore
cubbon+park–india
bangalore–india As such, in an implementation, a number or series of statistical features or metrics may now be generated or computed. For example, statistical features or metrics may comprise one or more variants of a conditional probability or, optionally or alternatively, may comprise one or more combined probabilistic features, as described below.

As was previously discussed, in certain implementations, it may be desirable to reduce or lessen an impact (e.g., via probability values, etc.) of a single user searching for or entering a particular query a number of times within a statistically small window or period of time (e.g., within half-hour, hour, etc.). Accordingly, in one particular implementation, rather than counting the number of times an entity or a pair of entities appears (e.g., in a query log, etc.), instead, the number of distinct or particular users using that particular entity or a pair of entities may be counted. Here, for example, by counting every entity-facet pair in every single instance of the entity and in every single instance of the facet only once per a particular user, a respective statistical feature or metric may be less prone to an impact a single user may have on a ranking order of facets. Of course, this is merely an example relating to computing one particular feature or metric, and claimed subject matter is not so limited. To illustrate, in one particular implementation, a statistical feature may comprise, for example, a non-symmetric feature represented by a single-user-prone variant of a conditional probability, such as a conditional user probability, that may be computed as:

$$P(f \mid e) = \frac{|e \cap f|}{|e|}$$

where $|e|$ denotes a number of users that used entity e in an event, and $|e \cap f|$ denotes a number of users that used both an entity facet pair (e, f) in an event. Again, this is merely an example of a particular single-user-prone variant of a non-symmetric feature that may be utilized to facilitate or support ranking entity facets using user-click feedback, and claimed subject matter is not so limited.

It should be appreciated that various statistical features or metrics capturing relevance between facets and an entity of interest may also be computed or considered. Some examples of statistical features may include one or more of the following: atomic features that account for or work on one of the entities in a faceted relationship (e, f), such as, for example, an entity probability or an entity entropy; symmetric features, such as, for example, a point-wise mutual information or joint probability; non-symmetric features, such as, for example, a conditional probability or Kullback-Leibler (KL) divergence; and combinations of features, like $P_u(f|e)*P(f)$, for example, that combine a conditional user probability of a facet f given entity e and a probability of such a facet f. In certain implementations, combined features may provide or otherwise reveal new statistical information that may be advantageously included in a feature space or utilized by a ranking function. As a way of illustration, including one or more combined features in a feature space in connection with a learning process may allow a learning function to make a more informed decision, for example, if a particular combined feature is more descriptive, as was previously mentioned.

By way of example but not limitation, some example statistical features are presented in Table 6 below, which may be taken into consideration, in whole or in part, so as to facilitate or support one or more processes or operations associated with ranking of facets for a given entity of interest. It should be noted, however, that these are merely illustrative examples relating to statistical features that may be extracted or otherwise derived from one or more ranking corpora, and that claimed subject matter is not limited to particular features shown. It should also be appreciated that some or all statistical features may include a single-user-prone variant preventing or otherwise reducing an instance(s) where a single user may overly influence or affect statistics (e.g., via probability scores, etc.) with respect to a ranking order of facets. For example, with respect to some or all statistical features, the number of distinct or particular users using certain entities or pairs of entities of interest may be counted (e.g., once per a particular user, etc.), just to illustrate one possible approach to which claimed subject matter is not limited.

TABLE 6

Example statistical features.

| Feature | Description |
|---|---|
| $P(e)$ | Entity probability |
| $P(f)$ | Facet entity probability |
| $E(e)$ | Entity entropy |
| $E(f)$ | Facet entity entropy |
| $KL(e)$ | KL-Divergence of entity vs. collection |
| $KL(f)$ | KL-Divergence of facet vs. collection |
| $P(e, f)$ | Joint probability |
| $P_u(e, f)$ | Joint user probability |
| $SI(e, f)$ | Pointwise mutual information |
| $CS(e, f)$ | Cosine similarity |
| $P(e|f)$ | Conditional probability |
| $P_u(e|f)$ | Conditional user probability |
| $P(f|e)$ | Reverse conditional probability |
| $P_u(f|e)$ | Reverse conditional user probability |
| $P_u(e|f) * P(f)$ | Combined feature 1 |
| $P_u(e|f)/P(f)$ | Combined feature 2 |
| $P_u(f|e) * P(f)$ | Combined feature 3 |
| $P_u(f|e) * E(f)$ | Combined feature 4 |
| $P_u(e, f) * P(f)$ | Combined feature 5 |
| $P_u(e, f)/P(f)$ | Combined feature 6 |
| $P_u(e, f) * E(f)$ | Combined feature 7 |
| $P_u(e, f)/E(f)$ | Combined feature 8 |

In an implementation, one or more statistical features extracted or derived from one or more ranking corpora, such as three statistical sources discussed above, for example, may be combined linearly with respective weights for each corpus or source to construct or otherwise arrive at a ranking function. By way of example but not limitation, with respect to a query term, query session, or Flickr® tag corpora or sources, a ranking function rank (e, f) may be computed as:

$$\text{rank}(e,f) = w_{qt} \times P_{qt}(f|e) + w_{qs} \times P_{qs}(f|e) + w_{ft} \times P_{ft}(f,e) \quad (1)$$

where $P_{qt}(f|e)$, $P_{qs}(f|e)$, $P_{ft}(f, e)$ represent conditional probabilities, and $w_{qt}$, $w_{qs}$, and $w_{ft}$ denote weights for different corpora or sources, such as, for example, query terms (qt), query session (qs), and Flickr® photo tag collection (ft). By way of example but not limitation, in one particular simulation or experiment, it appeared that based, at least in part, on editorial judgments assessed or collected for a sample number of entity-facet pairs (e.g., 100, 200, 300, etc.), a linear combination of conditional probabilities with weights $w_{qt}=2$, $w_{qs}=0.5$, and $w_{ft}=1$ may prove beneficial in ranking facets for a given query, for example, in the context of image searches. Of course, claimed subject matter is not so limited in scope. For example, in certain implementations, a ranking function based, at least in part, on a linear combination of conditional probabilities may be used as a baseline function or operation in connection with one or more testing, training, or development methods or processes.

Although a linear combination of conditional probabilities, a ranking task of which is defined in connection with Relation 1 above, may be a useful approach in determining a ranking order of facets, it may be advantageous to incorporate user-click feedback information in conjunction with one or more statistical features into a process of learning one or more ranking functions, as previously mentioned. Here, a ranking function may comprise, for example, a machine-learned function trained or established to predict an actual CTR on a facet given an entity of interest, just to illustrate one possible implementation. Typically, although not necessarily, "click-through-rate (CTR)" or "click-through probability" may be used interchangeably and may refer to a statistical probability that a search engine user will click on a facet f for a given entity e, assuming that the user looks at the facet. As was indicated, user-click feedback information representative of "click" or "view" statistics with respect to a particular facet for a given entity may be collected or obtained from one or more query logs, such as one or more image search query logs, for example, over a certain period of time. User-feedback information may, for example, be used, in whole or in part, to compute or otherwise estimate one or more variants of click-through rates. For example, a raw CTR $ctr_{e,f}$ for a given entity detected in a user query for which facets were shown to a user may be computed as:

$$ctr_{e,f} = \frac{clicks_{e,f}}{views_{e,f}} \quad (2)$$

where $clicks_{e,f}$ denotes a number of clicks on a facet f shown in relation to entity e, and $views_{e,f}$ denotes a number of times a facet f is shown to a user for a related entity e.

In certain implementations, a conditional variant of a CTR may also be considered, for example, wherein "views" are counted only where there was a "click" on a facet shown in relation to an entity, rather than counting "views" each time a facet was shown, even though there were no "clicks" (e.g., raw CTR). Here, for example, for each of a position or slot that can be filled on a returned search results page (e.g., for ten positions or slots, etc.), a conditional CTR representative of an expected CTR at a given position in the ranking may be computed. In certain simulations or experiments it has been observed that typically, although not necessarily, click-through rates may decline with a position at which a facet is shown, the phenomenon which may herein be referred to as a position or user bias. For example, it appeared that facets displayed less prominently among other faceted recommendations, such as, for example, in lower positions or slots in a listing of a returned search results page are less likely to be clicked on, even though such facets may be deemed to be relevant. Of course, such an observation relating to position or user bias is provided herein by way of example, and claimed subject matter is not limiter in this regard. Accordingly, a click-over-expected-click (COEC) probability variant may be introduced, for example, to attempt to handle such a position or user bias.

Thus, in an implementation, a COEC variant may be computed or estimated for one or more entity-facet pairs of interest (e.g., in a dictionary or pool, etc.). Here, a COEC may be computed or estimated based, at least in part, on a number of "clicks" and "views" at a given position considering how many times a facet was seen and viewed at that position, for example, and a conditional CTR of the position. More specifically, in one particular implementation, a conditional CTR or $ctr_p$ may be estimated, at least in part, as an aggregated CTR (e.g., over all queries and sessions, etc.) in position p for all positions P, for example. In this illustrated example, then, a probability of a COEC on a facet f for a given entity e or $coec_{e,f}$ may be estimated as:

$$coec_{e,f} = \frac{clicks_{e,f}}{\sum_{p=1}^{P} views_{e,f,p} \times ctr_p} \qquad (3)$$

where $clicks_{e,f}$ denotes a number of clicks on a facet f shown in relation to entity e, and $views_{e,f}$ denotes a number of times a facet f is shown to a user for a related entity e at a position p. In this illustrate example, the denominator in Relation 3 may be considered as representing a number of expected "clicks" given the positions in which a resource identified or URL appeared (e.g., in query logs, etc.). In certain simulations or experiments, it has been observed that if a COEC of a particular facet is higher than 1.0, for example, it may indicate that the interest of a user in that particular facet was higher than expected for a facet at that particular position. Of course, this is merely an example, and claimed subject matter is not so limited.

In certain situations where, for example, conditional CTR, COEC, or like values for facets of interest may comprise statistically significant range variations, to lessen or reduce an impact of a particular entity or query (e.g., with statistically higher or somewhat disproportionate CTR, COEC values, etc.), conditional CTR, COEC, or like values may be normalized per related facet by distributing or re-distributing respective values within a range of [0, 1]. Thus, in certain instances, an impact of a particular query may be lessened by reducing an undue emphasis on these statistically higher or somewhat disproportionate CTR, COEC, etc. values (e.g., skewed, etc.) in relation to lower CTR, COEC, etc. values associated with other related facets for a given entity. Here, normalization, for example, may effectively bring different or skewed values into the same training or evaluation space, which may be advantageously utilized for training one or more ranking functions, comparing performances between various ranking models or operations, or the like. Of course, this is merely one possible example. Many forms of normalization may be employed.

In one implementation, editorial judgments or assessments may be mixed or combined with CTR, COEC, or like values or their normalized variants in some manner to allow for leveraging of a feature space (e.g., via editorially selected relevance labels, etc.) associated, for example, with one or more machine-learned training techniques, though claimed subject matter is not so limited. For example, for a given entity, one or more faceted recommendations may be labeled by a human editor(s) with a grade based, at least in part, on the perceived degree of relevance. Here, by way of example, four judgment grades, such as "excellent," "good," "fair," or "bad" corresponding to a graded relevance scale values of 3-2-1-0, respectively, may be applied to an entity-facet pair, just to illustrate one possible implementation. To mix editorial assessments with CTR values, in one particular implementation, one or more CTR values may be bucketed into the above graded relevance scale values. To illustrate, in a bucketed CTR formulation, about half of facets may be judged "bad," of the remaining facets, half may be judged "fair," half of the remaining facets then may be judged "good", and the rest of the facets may be judged "excellent." As a result, a fewer number of facets will have "excellent" grades, for example, in relation to facets graded "good," and a fewer number of facets will be judged "good" in relation to facets graded "fair" and so forth. Of course, such details relating to mixing or combining editorial assessments with CTR or like values are merely examples, and claimed subject matter is not limited in this regard.

As previously mentioned, in an implementation, an example process associated with ranking entity facets using user-click feedback may include, for example, training or establishing a machine-learned function that may be utilized, in whole or in part, to determine a ranking order of facets for a given query by predicting or estimating an actual CTR on a facet. As described below, such a machine-learned function may comprise a ranking function trained or established based, at least in part, on one or more inputs or applications of user-click feedback in conjunction with one or more statistical features extracted or derived from one or more ranking corpora. Here, an example process may include training a machine-learned function, in whole or in part, without editorial input (e.g., in an unsupervised mode). Optionally or alternatively, a machine-learned function may be trained, in whole or in part, in a supervised learning setting that may allow for leveraging of a feature space, for example, by combining user-click information with editorial assessments or graded feedback on facets for an entity of interest. Of course, this is merely an example to which claimed subject matter is not limited.

In certain implementations, a stochastic Gradient Boosted Decision Tree (GBDT) function may be used, for example, to learn or establish a ranking function that may be utilized, in whole or in part, to efficiently or effectively rank entity facets for a given query. It should be noted that other functions or techniques capable of producing or establishing a ranking function, for example, via logistic loss or regression operation, or the like may also be utilized, and that claimed subject matter is not limited to one particular technique or approach. Other suitable learner functions may include SVMLight or Sparse On-line Learning (e.g., via truncated gradient), just to name a few examples.

For purposes of explanation, a stochastic GBDT is an additive classification or regression function that constructs an additive regression model utilizing decision trees as weak learners. GBDT may be adaptable, and different loss functions may be used during boosting. In certain implementations, least squares regression, for example, may be employed as a loss function. Trees in stochastic GBDT may be trained on a randomly selected subset of a training data or information and may be less prone to over-fitting. Depending on implementation, one or more learning objectives may include, for example, predicting an actual click-thru rate, click over expected click rate, etc. of an entity-facet pair, or any combination thereof. Again, claimed subject matter is not so limited in scope.

In one particular implementation, a GBDT function may be employed to learn a ranking function predicting an actual CTR on a facet based, at least in part, on one or more inputs or applications of COEC values of entity-facet pairs of interest in conjunction with one or more statistical features reducing an impact of a single user, though claimed subject matter is not so limited. By way of example but not limitation, in certain experiments or simulations, 300 trees with 30 leaf nodes per a tree, a shrinkage parameter of 0.04, and a sampling rate of 0.5 were used. Here, it appeared that a GBDT function trained on a COEC model or operation in conjunction with single-user-prone features, for example, may prove beneficial in effectively or efficiently predicting an actual CTR on a facet. For example, in one particular simulation or experiment, to evaluate performance of a GBDT function trained on a COEC model or $GBDT_{coec}$, a number of test sets or ranking strategies were applied against such a $GBDT_{coec}$.

Here, for example, test sets or ranking strategies applied against a $GBDT_{coec}$ included those listed below, though claimed subject matter is not so limited.

Baseline. A linear combination of conditional probabilities, such as a linear combination of conditional probabilities extracted or derived from query terms, query session, and Flickr® photo tag collection, for example, a ranking task of which is defined in connection with Relation 1 above.

$GBDT_{ctr}$. GBDT trained on a CTR click model or operation. Similarly to GBDT trained on a COEC click model or operation, $GBDT_{ctr}$ may be trained based, at least in part, on one or more inputs or applications of user-click feedback, such as, for example, raw CTR values, as defined in connection with Relation 2, in conjunction with one or more statistical features extracted or derived from one or more ranking corpora. As previously mentioned, here, ranking corpora may comprise, for example, query terms, query session, and Flickr® photo tag collection, though claimed subject matter is not so limited. By way of example but not limitation, in one particular simulation or experiment, 300 trees with 30 leaf nodes, sampling rate of 0.5, and a shrinkage parameter of 0.03 were used.

Evaluation metrics. In certain implementations, performance of one or more test sets may be measured, for example, in terms of Discounted Cumulative Gain (DCG) or normalized Discounted Cumulative Gain (nDCG). For purposes of explanation, DCG is a measure of effectiveness or performance allowing for use of a graded relevance scale (e.g., of documents, facets, etc.). Typically, although not necessarily, DCG may measure usefulness or gain of a document (e.g., a facet for a given entity, etc.) based, at least in part, on its position in a listing of search results. It should be appreciated that various other evaluation measures or metrics, such as, for example, metrics allowing for utilization of a graded relevance scale may be employed. As previously mentioned, one or more CTR, COEC, or like values may be normalized to be in a range of [0, 1], for example, so as to facilitate or support a statistically substantiated or otherwise fair comparison between different queries. For example, a DCG at a position p may be computed as:

$$DCG@p = gain_1 + \sum_{i=0}^{p} \frac{gain_i}{\log_2(i)}$$

In addition, a normalized DCG at a normalized position p for a given ranking system (e.g., $DCG_{run}$), for example, may be computed as:

$$nDCG@n = \frac{DCG_{run}@n}{DCG_{ideal}@n}$$

where $DCG_{ideal}@n$ denotes a statistically desired, near-ideal, or ideal ranking that may be obtained, for example, by sorting entity facets in descending order of CTR or COEC.

Figure 2A:
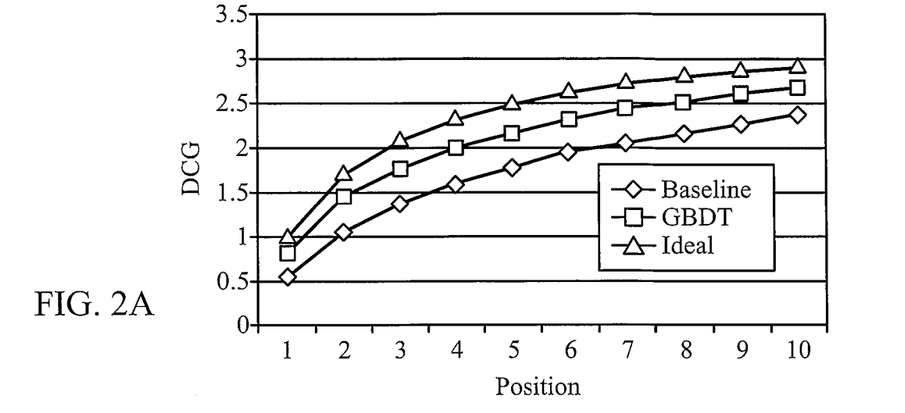
FIGS. 2A-2C are graphs illustrating performances of various ranking strategies.
Figure 2B:
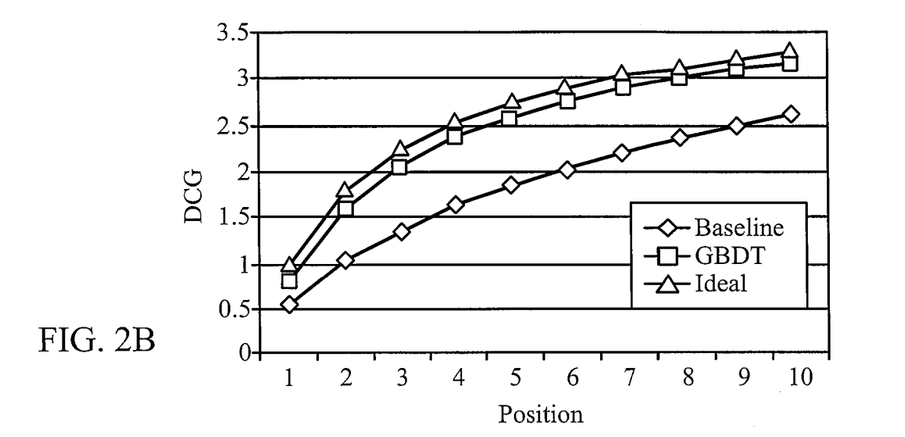

FIGS. 2A-2B illustrate performance of a baseline and GBDT against an ideal or statistically desired run based, at least in part, on a CTR and COEC test sets, respectively, at different or various positions in the ranking. Here, for example, an ideal run may illustrate a statistically desired or suitable performance (e.g., better performance, etc.) on both test sets utilizing sample information, as discussed above, to which claimed subject matter is not limited. As seen, for the first ten sample positions in the ranking, a GBDT models or operations performed sufficiently well and out performed a baseline model or operation. As also illustrated, performance of GBDT models or operations is somewhat statistically closer to an ideal or statistically desired performance, which may indicate that using, at least in part, user-click feedback may prove to be beneficial when learning to rank entity facets.

Figure 2C:
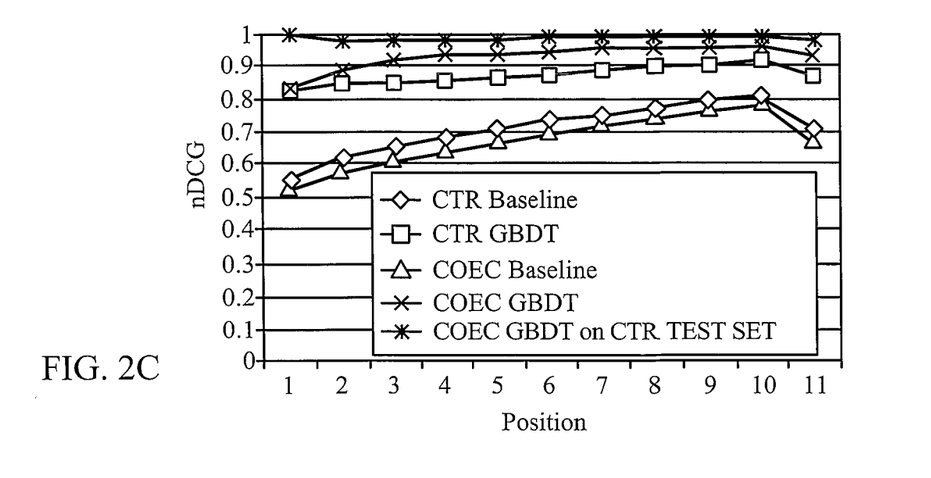

FIG. 2C illustrates performance of a baseline and GBDT models or operations on CTR versus COEC test sets in terms of a normalized DCG. As seen, statistically significant improvement in performance using a COEC model appears to be achieved. In addition, it appears that GBDT trained, at least in part, on a COEC model may sufficiently closely approximate an actual CTR as experienced or evidenced by users and, thus, tends to achieve a statistically desired or otherwise better performance on a CTR test set, for example, over the first ten sample positions in the ranking.

By way of example but not limitation, Table 7 shown below illustrates relative feature importance of top ten useful or desirable features according to two GBDT models or operations with respective feature weights. As seen in this illustrated example, it appears that for both models, five out of ten statistical features are based, at least in part, on a query term analysis. It also appears that it may be desirable to reduce an impact of a single user on statistics collected, for example, since single-user-prone features are dominantly present among the top ten. In addition, it may also be observed that it may be advantageous or useful to consider certain combined features, for example, so as to extend a descriptiveness of a feature space for $GBDT_{ctr}$ or $GBDT_{coec}$ models or operations. Of course, relative feature importance and respective weights are provided as merely examples, and claimed subject matter is not limited in this regard.

TABLE 7

Example relative feature importance for GBDT.

| $GBDT_{ctr}$ | | $GBDT_{coec}$ | |
|---|---|---|---|
| Feature | Weight | Feature | Weight |
| QS $P_u$(e\|f) * P(f) | 100 | QT $P_u$(e, f)/P(f) | 100 |
| QT P(e) | 85.11 | FT P(e) | 11.56 |
| QS P(e) | 76.88 | QT P(e) | 9.57 |
| QT $P_u$(e, f) | 69.32 | QS P(e) | 9.22 |
| QT $P_u$(e\|f) * P(f) | 69.21 | FT E(e) | 9.22 |
| QT $P_u$(f\|e) * P(f) | 64.38 | FT KL(e) | 8.84 |
| QS P(e, f) | 59.78 | QT $P_u$(f\|e) * P(f) | 8.19 |
| QT P(e, f) | 52.98 | QT $P_u$(e\|f) * P(f) | 8.14 |
| QS $P_u$(e, f) | 48.26 | QS P(f) | 7.53 |
| FT P(e) | 43.71 | QT $P_u$(e, f) | 7.25 |

QT: Query term;
QS: Query session;
FT: Flickr tag.

Figure 3A:
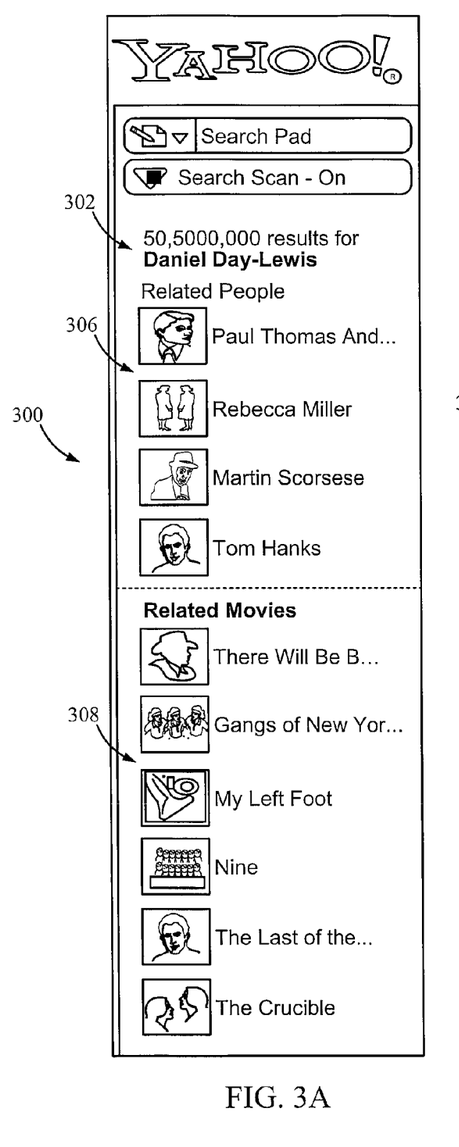
FIGS. 3A-3B are illustrative representations of an implementation of fragmented screenshot views representative of faceted image search results.
Figure 3B:
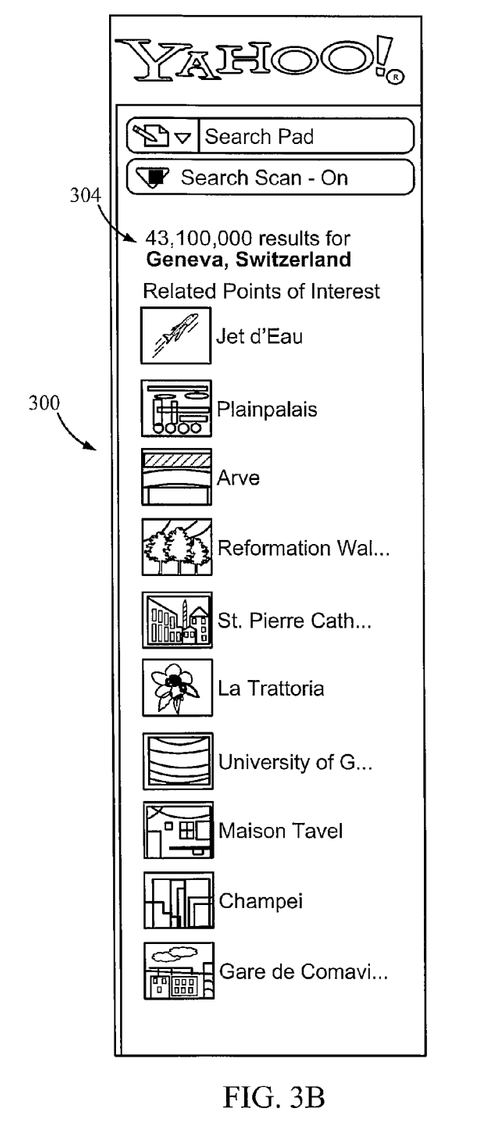

As was previously mentioned, in one particular implementation, ranked facets may be integrated or incorporated, for example, into a search results page so as to possibly enhance user experience in the context of a faceted image search by providing an ergonomic or interactive user environment. Attention is now drawn to FIGS. 3A-3B, which are illustrative representations of fragmented screenshot views of how a search engine may present faceted image search results in response to a query. As illustrated, a listing of facets represented herein, for example, by selectable tabs or facet bars 300 may be ranked for a given query entity, such as, for example, the celebrity query entity "Daniel Day-Lewis," indicated generally at 302, or the location query entity "Geneva, Switzerland," shown at 304. As was also indicated, in certain simulations or experiments, it has been observed that typically, although not necessarily, grouping facets by type may lead to a higher engagement of a user with the facets. Accordingly, as particularly seen in FIG. 3A, since there is a diversity in the facet types for the query entity "Daniel Day-Lewis" (e.g., in a dictionary or pool of facets, etc.), the facets are not shown in an original ranking, but according to a ranking after grouping by type, such as, for example, "Related People," shown at 306, and "Relater Movies," shown at 308 Optionally or alternatively, related facets may be ranked without such a grouping, as illustrated in FIG. 3B. Of course, this is merely one possible example relating to presenting search results to a user in the context of a faceted image search, and claimed subject matter is not limited in this regard.

Figure 4:
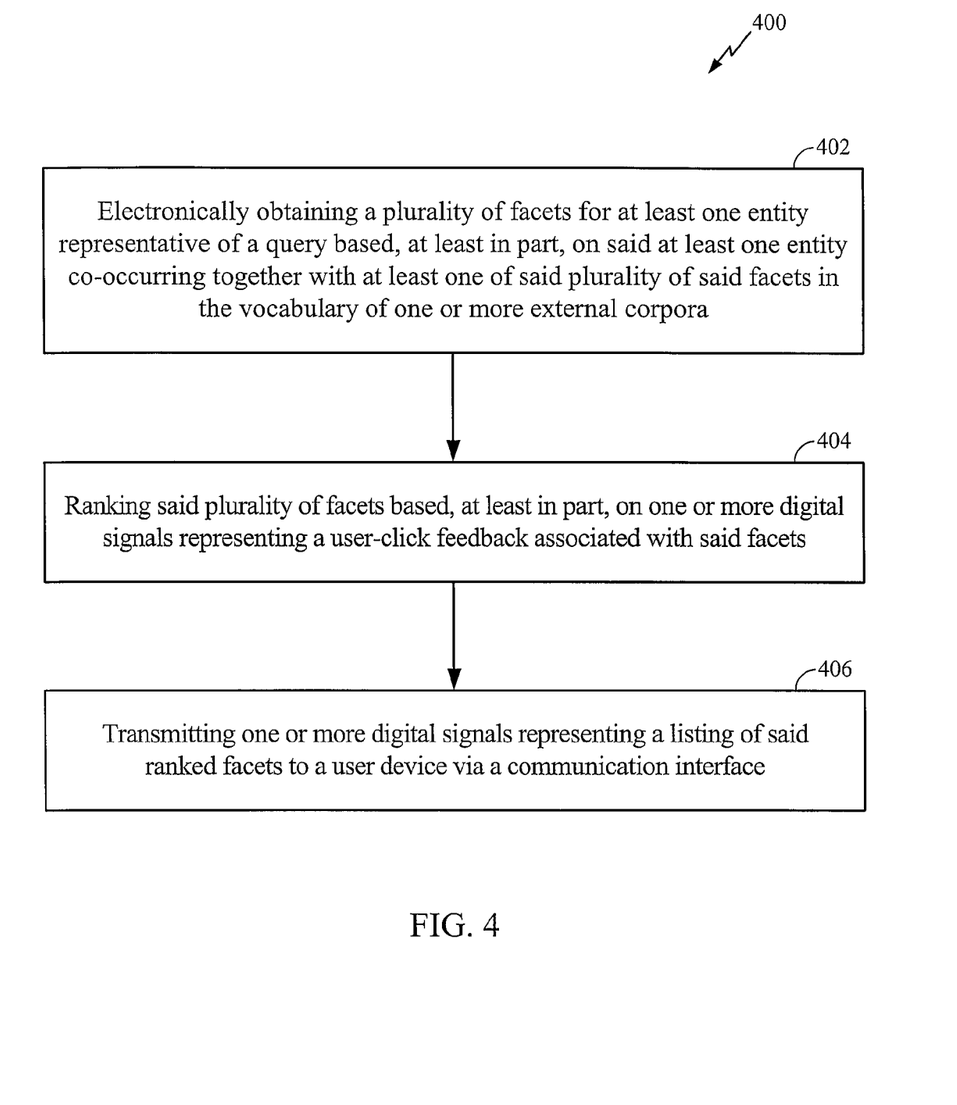
FIG. 4 is a flow diagram illustrating an implementation of a process of ranking entity facets using user-click feedback.

Attention is drawn next to FIG. 4, which is a flow diagram illustrating an implementation of an example process 400 that may be implemented in one or more special purpose computing devices, partially, dominantly, or substantially, to facilitate or support one or more processes associated with ranking entity facets using user-click feedback. It should be noted that information applied or produced, such as, for example, inputs, applications, outputs, operations, results, etc. associated with example process 400 may be represented by one or more digital signals. Example process 400 may begin, for example, at operation 402, with electronically obtaining a plurality of facets for at least one entity representative of a query based, at least in part, on at least one entity co-occurring together with at least one of such a plurality of facets in the vocabulary of one or more information corpora. As was indicated, such one or more information corpora may comprise, for example, one or more extraction corpora. In one implementation, such extraction corpora may include, for example, a set of structured or semi-structured sources or like collection of information (e.g., user-generated, service provider-generated, external, etc.) where entities and facets are explicitly marked-up, though claimed subject matter is not so limited. Optionally or alternatively, one or more string matching solutions or algorithms may be utilized to match an entity of interest to a corresponding relation instance.

At operation 404, a plurality of facets may be ranked based, at least in part, on one or more digital signals representing a user-click feedback. In certain implementations, a user-click feedback may be representative, for example, of information in the form of "click" or "view" statistics in relation to one or more facets for a given entity collected or obtained from one or more query logs. In addition, certain statistical information related to co-occurrences of entity-facet pairs represented by tags annotating images or photos associated with the vocabulary of an image or photo sharing database, for example, may be also considered in connection with collecting or obtaining user-click feedback information. In one particular implementation, a ranking order of facets may be determined based, at least in part, on a GBDT function trained on a COEC click model or operation, though claimed subject matter is not so limited. With regard to operation 406, one or more digital signals representing a listing of ranked facets may be transmitted to a user or client device via a communication interface. In one implementation, ranked facets may be integrated or incorporated, for example, into a search results page so as to possibly enhance user experience in the context of a faceted image search by providing an ergonomic or interactive user environment, as discussed above. For example, a displayed page may include one or more segmented portions incorporating various facets representing search results grouped, at least in part, by a type of faceted relationships (e.g., related persons, related movies, related locations, etc.). As such, facets may be ranked with respect to a particular entity (e.g., a query) in relation to one or more other facets within such one or more groups.

Figure 5:
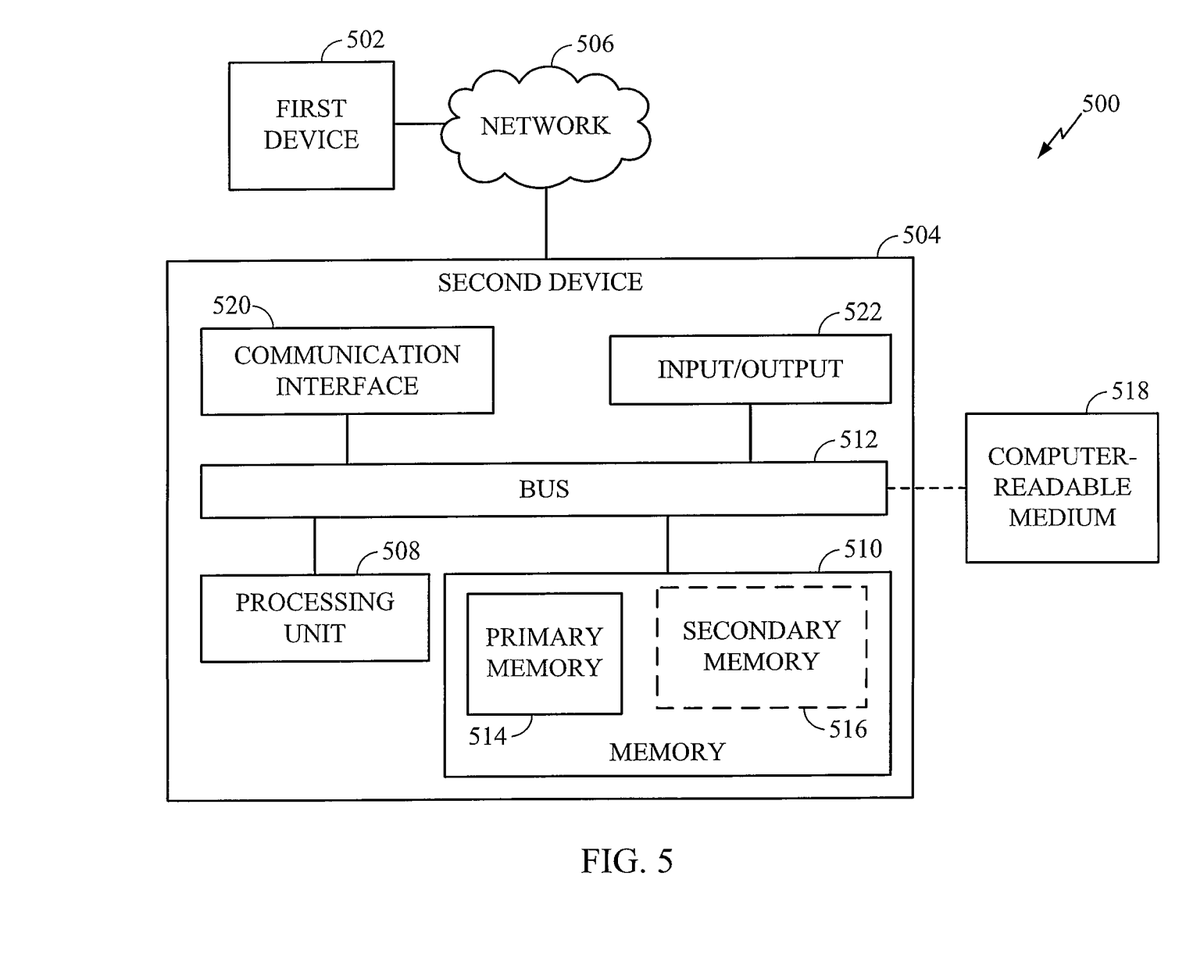
FIG. 5 is a schematic diagram illustrating an implementation of a computing environment associated with one or more special purpose computing apparatuses supportive of the process of FIG. 4.

FIG. 5 is a schematic diagram illustrating an example computing environment 500 that may include one or more devices that may be configurable to implement a process of ranking entity facets using user-click feedback, partially, dominantly, or substantially, in the context of information searches, on-line or off-line experiments or simulations, modeling, or the like.

Computing environment system 500 may include, for example, a first device 502 and a second device 504, which may be operatively coupled together via a network 506. In an embodiment, first device 502 and second device 504 may be representative of any electronic device, appliance, or machine that may have capability to exchange information over network 506. Network 506 may represent one or more communication links, processes, or resources having capability to support exchange or communication of information between first device 502 and second device 504. Second device 504 may include at least one processing unit 508 that may be operatively coupled to a memory 510 through a bus 512. Processing unit 508 may represent one or more circuits to perform at least a portion of one or more information computing procedures or processes.

Memory 510 may represent any information storage mechanism. For example, memory 510 may include a primary memory 514 and a secondary memory 516. Primary memory 514 may include, for example, a random access memory, read only memory, etc. In certain implementations, secondary memory 516 may be operatively receptive of, or otherwise have capability to be coupled to, a computer-readable medium 518.

Computer-readable medium 518 may include, for example, any medium that can store or provide access to information, code or instructions for one or more devices in system 500. It should be understood that a storage medium may typically, although not necessarily, be non-transitory or may comprise a non-transitory device. In this context, a non-transitory storage medium may include, for example, a device that is physical or tangible, meaning that the device has a concrete physical form, although the device may change state. For example, one or more electrical binary digital signals representative of information, in whole or in part, in the form of zeros may change a state to represent information, in whole or in part, as binary digital electrical signals in the form of ones, just to illustrate one possible implementation. As such, "non-transitory" may refer, for example, to any medium or device remaining tangible despite this change in state.

Second device 504 may include, for example, a communication adapter or interface 520 that may provide for or otherwise support communicative coupling of second device 504 to a network 506. Second device 504 may include, for example, an input/output device 522. Input/output device 522 may represent one or more devices or features that may be able to accept or otherwise input human or machine instructions, or one or more devices or features that may be able to deliver or otherwise output human or machine instructions.

According to an implementation, one or more portions of an apparatus, such as second device 504, for example, may store one or more binary digital electronic signals representative of information expressed as a particular state of a device, for example, second device 504. For example, an electrical binary digital signal representative of information may be "stored" in a portion of memory 510 by affecting or changing a state of particular memory locations, for example, to represent information as binary digital electronic signals in the form of ones or zeros. As such, in a particular implementation of an apparatus, such a change of state of a portion of a memory within a device, such a state of particular memory locations, for example, to store a binary digital electronic signal representative of information constitutes a transformation of a physical thing, for example, memory device 510, to a different state or thing.

Thus, as illustrated in various example implementations or techniques presented herein, in accordance with certain aspects, a method may be provided for use as part of a special purpose computing device or other like machine that accesses digital signals from memory and processes such digital signals to establish transformed digital signals which may be stored in memory as part of one or more information files or a database specifying or otherwise associated with an index.

Some portions of the detailed description herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described and shown herein using various methods or systems, it should be understood by those skilled in the art that various other modifications may be made, or equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method comprising:

electronically determining a plurality of facets for at least one entity representative of a query based, at least in part, on said at least one entity co-occurring together with at least one of said plurality of said facets in the vocabulary of one or more information corpora, said at least one of said plurality of said facets comprising a lexical object related to said at least one entity via a directed relationship capable of predicting user intent for said query for faceted recommendations via a returned search results page, said faceted recommendations comprising one or more entity-facet pairs extracted from said one or more information corpora based, at least in part, on a conditional probability of said at least one entity co-occurring together with said at least one of said plurality of said facets; and ranking said plurality of facets based, at least in part, on one or more digital signals representing a user-click feedback associated with said facets, wherein one or more of: said electronically determining said plurality of facets or said ranking said plurality of facets is performed before search results are retrieved.

2. The method of claim 1, wherein said electronically determining said plurality of facets for said at least one entity further comprises:

electronically performing at least one of the following analyses: a query term analysis; a query session analysis; a tag co-occurrence analysis; or any combination thereof; and electronically performing a statistical analysis with respect to at least one of said electronically performed analyses.

3. The method of claim 2, wherein said electronically performing said statistical analysis comprises generating at least one of the following features: an atomic feature; a symmetric feature; a non-symmetric feature; a combined feature; or any combination thereof.

4. The method of claim 3, wherein said at least one of said generated features comprises a single-user-prone feature.

5. The method of claim 1, wherein said ranking said plurality of facets comprises:

obtaining one or more digital signals representing user-click feedback; and electronically estimating one or more statistical values based, at least in part, on said obtained user-click feedback.

6. The method of claim 5, wherein said one or more statistical values comprises at least one of the following: one or more raw click-through rate (CTR) values; one or more conditional CTR values; one or more click-over-expected-click (COEC) values; or any combination thereof.

7. The method of claim 5, wherein said one or more statistical values comprises one or more normalized statistical values.

8. The method of claim 7, wherein said one or more normalized statistical values comprises one or more bucketed statistical values.

9. The method of claim 5, and further comprising:
training at least one machine-learned function based, at least in part, on one or more inputs or applications of said one or more statistical values estimated based, at least in part, on said user-click feedback.

10. The method of claim 9, wherein said training said at least one machine-learned function further comprises training said at least one machine-learned function in an unsupervised mode.

11. The method of claim 10, wherein said training said at least one machine-learned function in an unsupervised mode further comprises training at least one ranking function to predict an actual CTR on a facet in conjunction with at least one of the following features: said atomic feature; said symmetric feature; said non-symmetric feature; said combined feature; or any combination thereof.

12. The method of claim 11, wherein said at least one of said features comprises a single-user-prone feature.

13. The method of claim 10, wherein said training at least one ranking function includes training based, at least in part, on a decision tree-type process.

14. The method of claim 1, wherein said ranking is determined based, at least in part, on at least one of the following: a COEC click model or operation; a CTR click model or operation; or any combination thereof.

15. An article comprising:
a non-transitory storage medium having instructions stored thereon executable by a special purpose computing platform to:
electronically determine a plurality of facets for at least one entity representative of a query to be based, at least in part, on said at least one entity co-occurring together with at least one of said plurality of said facets in the vocabulary of one or more information corpora, wherein said at least one of said plurality of said facets to comprise a lexical object to be related to said at least one entity via a directed relationship to be capable of predicting user intent for said query to make faceted recommendations via a returned search results page, said faceted recommendations to comprise one or more entity-facet pairs to be extracted from said one or more information corpora to be based, at least in part, on a conditional probability of said at least one entity co-occurring together with said at least one of said plurality of said facets; and
rank said plurality of facets to be based, at least in part, on one or more digital signals to represent user-click feedback to be associated with said facets, wherein one or more of: said to electronically determine said plurality of facets or said to rank said plurality of facets to be performed before search results are to be retrieved.

16. The article of claim 15, wherein said non-transitory storage medium having instructions to rank said plurality of facets includes instructions to:
obtain one or more digital signals to represent user-click feedback; and
electronically estimate one or more statistical values to be based, at least in part, on said obtained user-click feedback.

17. The article of claim 16, wherein said non-transitory storage medium having instructions to rank said plurality of facets further includes instructions to train a ranking function in which for said ranking function one or more inputs or applications of said one or more statistical values shall be at least partially used in conjunction with at least one of the following features: an atomic feature; a symmetric feature; a non-symmetric feature; a combined feature; a single-user-prone atomic feature; a single-user-prone symmetric feature; a single-user-prone non-symmetric feature; a single-user-prone combined feature; or any combination thereof.

18. An apparatus comprising:
a special purpose computing platform comprising one or more processors coupled to a memory to:
electronically determine a plurality of facets for at least one entity representative of a query to be based, at least in part, on said at least one entity co-occurring together with at least one of said plurality of said facets in the vocabulary of one or more information corpora, wherein said at least one of said plurality of said facets to comprise a lexical object to be related to said at least one entity via a directed relationship to be capable of predicting user intent for said query to make faceted recommendations via a returned search results page, said faceted recommendations to comprise one or more entity-facet pairs to be extracted from said one or more information corpora to be based, at least in part, on a conditional probability of said at least one entity co-occurring together with said at least one of said plurality of said facets; and
rank said plurality of facets to be based, at least in part, on one or more digital signals to represent user-click feedback to be associated with said facets, wherein one or more of: said to electronically determine said plurality of facets or said to rank said plurality of facets to be performed before search results are to be retrieved.

19. The apparatus of claim 18, wherein said special purpose computing platform to said electronically determine said plurality of facets further to:
electronically perform at least one of the following analyses: a query term analysis; a query session analysis; a tag co-occurrence analysis; or any combination thereof; and
electronically perform a statistical analysis with respect to at least one of said electronically performed analyses.

20. The apparatus of claim 19, wherein said special purpose computing platform to said electronically perform a statistical analysis further to generate at least one of the following features: an atomic feature; a symmetric feature; a non-symmetric feature; a combined feature; a single-user-prone atomic feature; a single-user-prone symmetric feature; a single-user-prone non-symmetric feature; a single-user-prone combined feature; or any combination thereof.

21. The apparatus of claim 20, wherein said special purpose computing platform further to train a ranking function based, at least in part, on one or more inputs or applications of one or more statistical values in conjunction with at least one of the following features: said conditional user probability-based feature; said atomic feature; said symmetric feature; said non-symmetric feature; said combined feature; said single-user-prone atomic feature; said single-user-prone symmetric feature; said single-user-prone non-symmetric feature; said single-user-prone combined feature; or any combination thereof.

22. The apparatus of claim 18, wherein said special purpose computing platform to said rank said plurality of facets further to rank said facets to be based, at least in part, on at least one of the following: a COEC click model or operation; a CTR click model or operation; or any combination thereof.

* * * * *